United States Patent
Sang et al.

(10) Patent No.: US 12,420,485 B2
(45) Date of Patent: Sep. 23, 2025

(54) MULTI-MODE 3D PRINT HEAD AND COLLABORATIVE PRINTING METHODS APPLYING THE SAME

(71) Applicant: TAIYUAN UNIVERSITY OF TECHNOLOGY, Shanxi (CN)

(72) Inventors: Shengbo Sang, Taiyuan (CN); Rihui Kang, Taiyuan (CN); Aoqun Jian, Taiyuan (CN); Runfang Hao, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/919,492

(22) Filed: Oct. 18, 2024

(65) Prior Publication Data
US 2025/0128471 A1    Apr. 24, 2025

(30) Foreign Application Priority Data
Oct. 20, 2023 (CN) .......................... 202311363276.1

(51) Int. Cl.
*B29C 64/209* (2017.01)
*B29C 64/295* (2017.01)
(Continued)

(52) U.S. Cl.
CPC .......... *B29C 64/209* (2017.08); *B29C 64/295* (2017.08); *B29C 64/393* (2017.08);
(Continued)

(58) Field of Classification Search
None
See application file for complete search history.

(56) References Cited

U.S. PATENT DOCUMENTS

| | | | |
|---|---|---|---|
| 2014/0070461 A1* | 3/2014 | Pax | B29C 64/393 425/375 |
| 2014/0252668 A1* | 9/2014 | Austin | B28B 3/20 425/375 |

(Continued)

FOREIGN PATENT DOCUMENTS

| | | |
|---|---|---|
| CN | 107336437 A | 11/2017 |
| CN | 108340571 A | 7/2018 |

(Continued)

OTHER PUBLICATIONS

First Office Action in Chinese Application No. 202311363276.1 mailed on Oct. 29, 2024, 10 pages.

(Continued)

*Primary Examiner* — Andrew L Swanson
(74) *Attorney, Agent, or Firm* — PORUS IP LLC

(57) ABSTRACT

Embodiments of the present disclosure provide a multi-mode 3D print head and a collaborative printing method applying the same. The print head body is provided with an extrusion hole, a feeding mechanism is provided above the extrusion hole, and a heating mechanism is provided below the extrusion hole. The print head body is further provided with a plurality of droplet addition holes and auxiliary side holes connected to the plurality of droplet ejection holes. The auxiliary side holes are provided perpendicular to the droplet addition holes and are detachably connected with an injection auxiliary component. The injection auxiliary component includes a sleeve secured to the auxiliary side hole, the sleeve is provided with a moving block. The sleeve is connected to an air pipe at an end away from the auxiliary side hole and is provided with an induction coil.

7 Claims, 13 Drawing Sheets

(51) Int. Cl.
    *B29C 64/393*    (2017.01)
    *B29C 64/118*    (2017.01)
    *B33Y 10/00*     (2015.01)
    *B33Y 30/00*     (2015.01)
    *B33Y 50/02*     (2015.01)

(52) U.S. Cl.
    CPC ............. *B29C 64/118* (2017.08); *B33Y 10/00* (2014.12); *B33Y 30/00* (2014.12); *B33Y 50/02* (2014.12)

(56) References Cited

U.S. PATENT DOCUMENTS

| | | | | |
|---|---|---|---|---|
| 2016/0101617 | A1* | 4/2016 | Kulas | B29C 64/106 425/150 |
| 2017/0320270 | A1 | 11/2017 | Mandel et al. | |
| 2022/0049521 | A1* | 2/2022 | Turnquist | E04H 12/341 |
| 2024/0139995 | A1* | 5/2024 | Kim | B22F 10/38 |

FOREIGN PATENT DOCUMENTS

| | | | |
|---|---|---|---|
| CN | 208376019 U | 1/2019 | |
| CN | 110901067 A | 3/2020 | |
| CN | 112848296 A | 5/2021 | |

OTHER PUBLICATIONS

Notification to Grant Patent Right for Invention in Chinese Application No. 202311363276.1 mailed on Nov. 19, 2024, 4 pages.

* cited by examiner

MULTI-MODE 3D PRINT HEAD AND COLLABORATIVE PRINTING METHODS APPLYING THE SAME

CROSS-REFERENCE TO RELATED APPLICATIONS

This application claims priority to Chinese application No. 2023113632761 filed on Oct. 20, 2023, the entire contents of which are incorporated herein by reference.

TECHNICAL FIELD

The present disclosure relates to a technical field of three-dimensional (3D) printing devices, and in particular, to a multi-mode 3D print head and a collaborative printing method applying the same.

BACKGROUND

The three-dimensional (3D) printing, a type of rapid prototyping, is a technology that constructs an object by printing layer by layer, based on a digital model file and utilizing a material such as powdered metal or plastic with a profile material.

Because of the different nature of the profile material, the existing 3D printers are mainly categorized into extrusion molding or droplet ejection for different profile materials, which results in the need to set up multiple 3D printers for the printing of the corresponding 3D print head. When the print program is performed, different print heads are replaced, so the position of the 3D print head is adjusted frequently to be able to use the corresponding material, which greatly affects the printing efficiency.

Therefore, it is desirable to provide a multi-mode 3D print head and a collaborative printing method applying the same, capable of automatically changing a printing mode and adjusting a height of the print head to improve printing efficiency.

SUMMARY

One or more embodiments of the present disclosure provide a multi-mode 3D print head, comprising: a print head body, wherein the print head body is provided with an extrusion hole, a feeding mechanism is provided above the extrusion hole, and a heating mechanism is provided below the extrusion hole; the print head body is arranged with a plurality of droplet ejection holes circumferentially along a center axis of the extrusion hole; a lower end of each of the plurality of droplet ejection holes is provided inclined toward one end of the extrusion hole, and the lower end of each of the plurality of droplet ejection holes is flush with a lower end of the extrusion hole; the plurality of droplet ejection holes are symmetrically arranged in pairs around the extrusion hole; straight lines of central axes of the plurality of droplet ejection holes intersect at an intersection point, and the intersection point is located directly below the extrusion hole; the print head body is further provided with a plurality of droplet addition holes and auxiliary side holes connected to the plurality of droplet ejection holes; an inner diameter of the plurality of droplet addition holes is greater than an inner diameter of the plurality of droplet ejection holes, and a droplet addition tube connected to an end away from the plurality of droplet ejection holes; the auxiliary side holes are provided perpendicular to the droplet addition holes and are detachably connected with an injection auxiliary component; the injection auxiliary component includes a sleeve secured to the auxiliary side hole, the sleeve is provided with a moving block, the outer surface of the moving block is circumferentially abutted against the inner wall of the sleeve and the end near the auxiliary side hole truncating the droplet addition hole; the moving block is further provided with an auxiliary ejection hole, two openings of the auxiliary ejection hole are disposed toward the plurality of droplet ejection holes and behind the auxiliary side hole, respectively; and the sleeve is connected to an air pipe at an end away from the auxiliary side hole and is provided with an induction coil.

One or more embodiments of the present disclosure provide a method for collaborative printing with a multi-mode 3D print head, wherein the method is configured for using the multi-mode 3D print head, and comprising: obtaining a three-dimensional model to be printed and profile material through a printing platform; slicing the three-dimensional model through a processor to obtain a to-be-printed slice of the three-dimensional model; determining, by the processor, a print program segment for droplet ejection and a print program segment for extrusion molding, based on an amount of the profile material and a dimension of the three-dimensional model, and delivering to a controller; determining, by the processor, a print program segment for droplet ejection and a print program segment for extrusion molding, based on an amount of the profile material and a dimension of the three-dimensional model, and delivering to a controller; finishing a print job.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Figure 1:
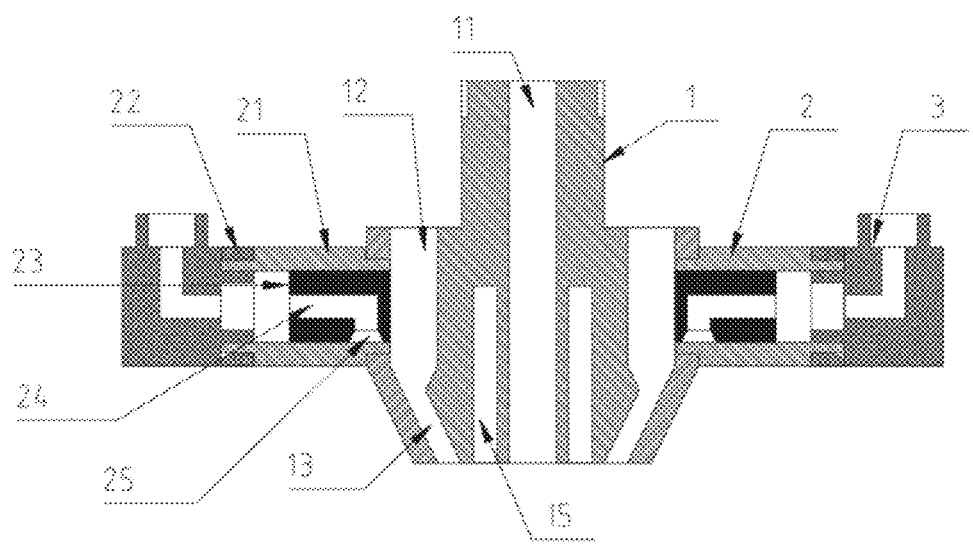
FIG. 1 is a schematic diagram illustrating a partially structured cross-sectional structure of a droplet addition state according to some embodiments of the present disclosure.

Components represented by each of the accompanying markings in the drawings are: 1. print head body; 11. extrusion hole; 12. droplet ejection hole; 13. droplet ejection hole; 14. auxiliary side hole; 15. annular groove; 2. injection auxiliary component; 21. sleeve; 22. induction coil; 23. moving block; 24. auxiliary ejection hole; 25. flare; 3. connecting member; 4. air pipe; 5. droplet addition seat; 6. droplet addition tube; 7. feeding mechanism; 71. connecting frame; 72. driving wheel; 73. follower wheel; 8. profile; 1010. adhesive collection component; 1011. scraping blade; 1012. groove.

DETAILED DESCRIPTION

In order to more clearly illustrate the technical solutions of the embodiments of the present disclosure, the accompanying drawings, which are required to be used in the description of the embodiments, are briefly described below. The accompanying drawings do not represent the entirety of the embodiments.

It should be understood that as used herein, the terms "system," "device," "unit" and/or "module" are used herein as a way to distinguish between different components, elements, parts, sections or assemblies at different levels. Words may be replaced by other expressions if other words accomplish the same purpose.

Unless the context clearly suggests an exception, the words "one," "a," and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

When describing the operations performed in the embodiments of the present specification in step-by-step instructions, the order of the steps is all interchangeable if not otherwise indicated, the steps may be omitted, and other steps may be included in the course of the operations.

A multi-mode 3D print head and a collaborative printing method applying the same provided by the embodiments of the present disclosure are differentiated from the existing structure in that printing of composite material is accomplished by setting up only one 3D print head, and according to an actual profile, it is capable of switching between an extrusion molding type and a droplet ejection type printing process depending on the actual profile. Differences in the above printing process require only the adjustment of the 3D print head to the corresponding preset height, and the above structure is capable of adjusting a magnetic force of the induction coil or the pneumatic pressure of the air tube according to the needs when in use, thereby the control of the amount of droplet addition can be realized, which can significantly improve the printing efficiency.

Figure 3:
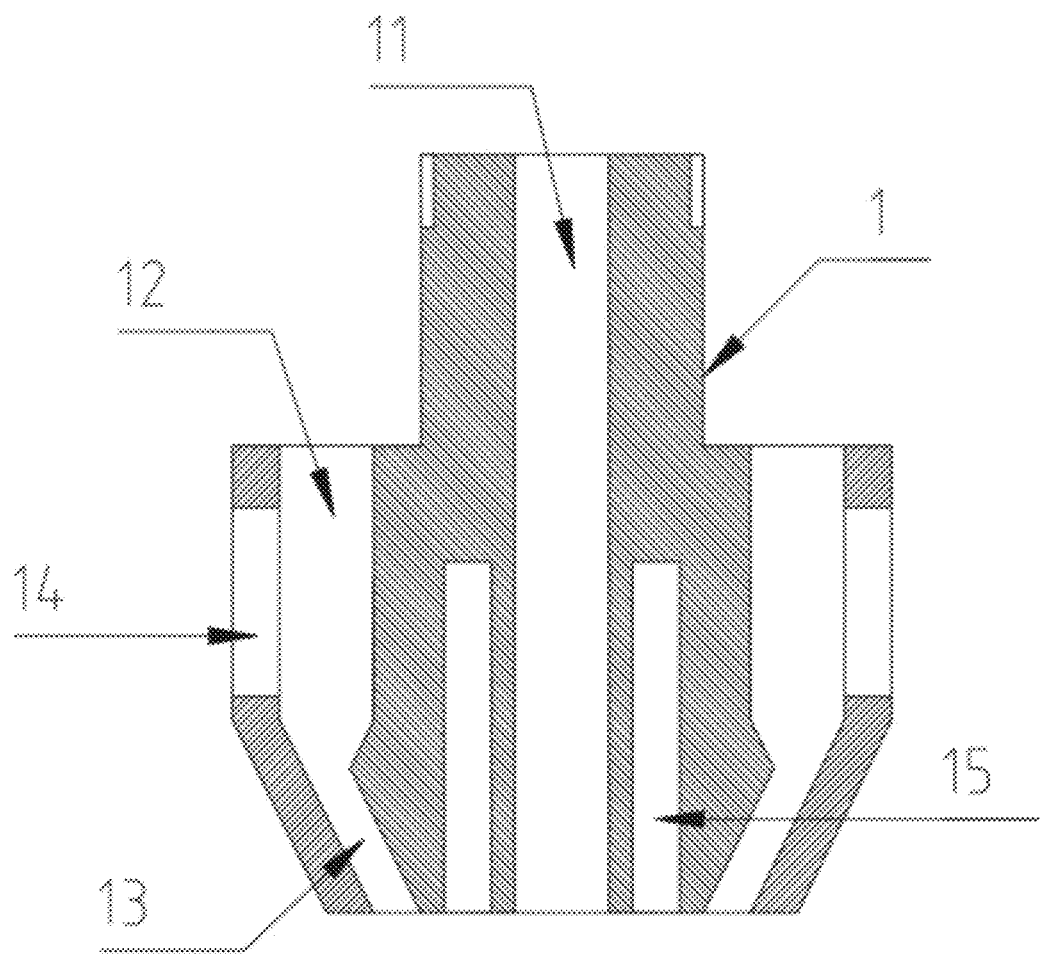
FIG. 3 is a schematic diagram illustrating a cross-sectional structure of a print head body according to some embodiments of the present disclosure.
Figure 8:
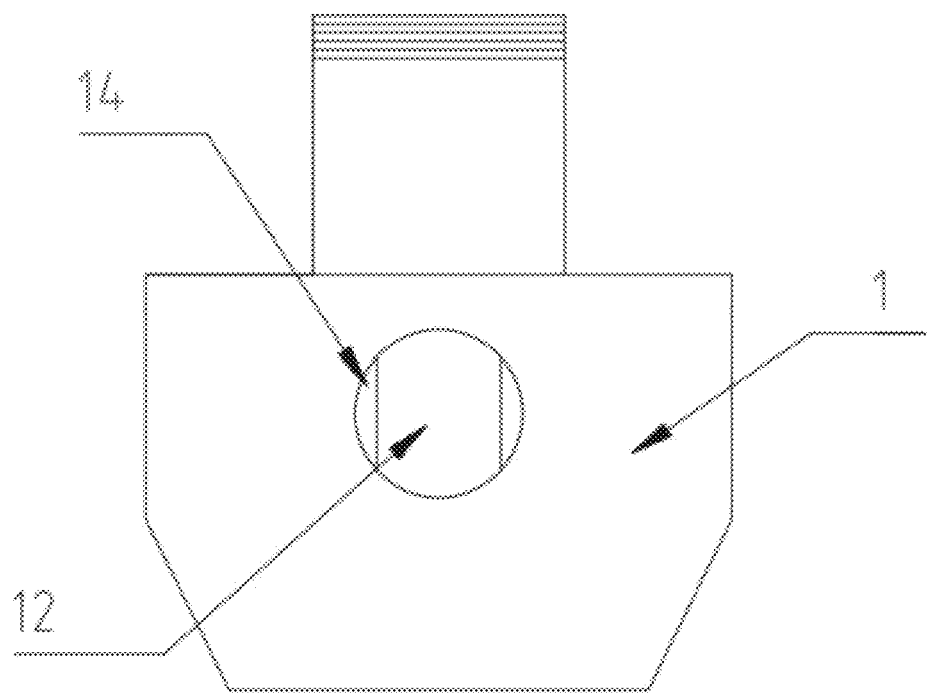
FIG. 8 is a schematic diagram illustrating a structure of a print head body shown according to some embodiments of the present disclosure.
Figure 9:
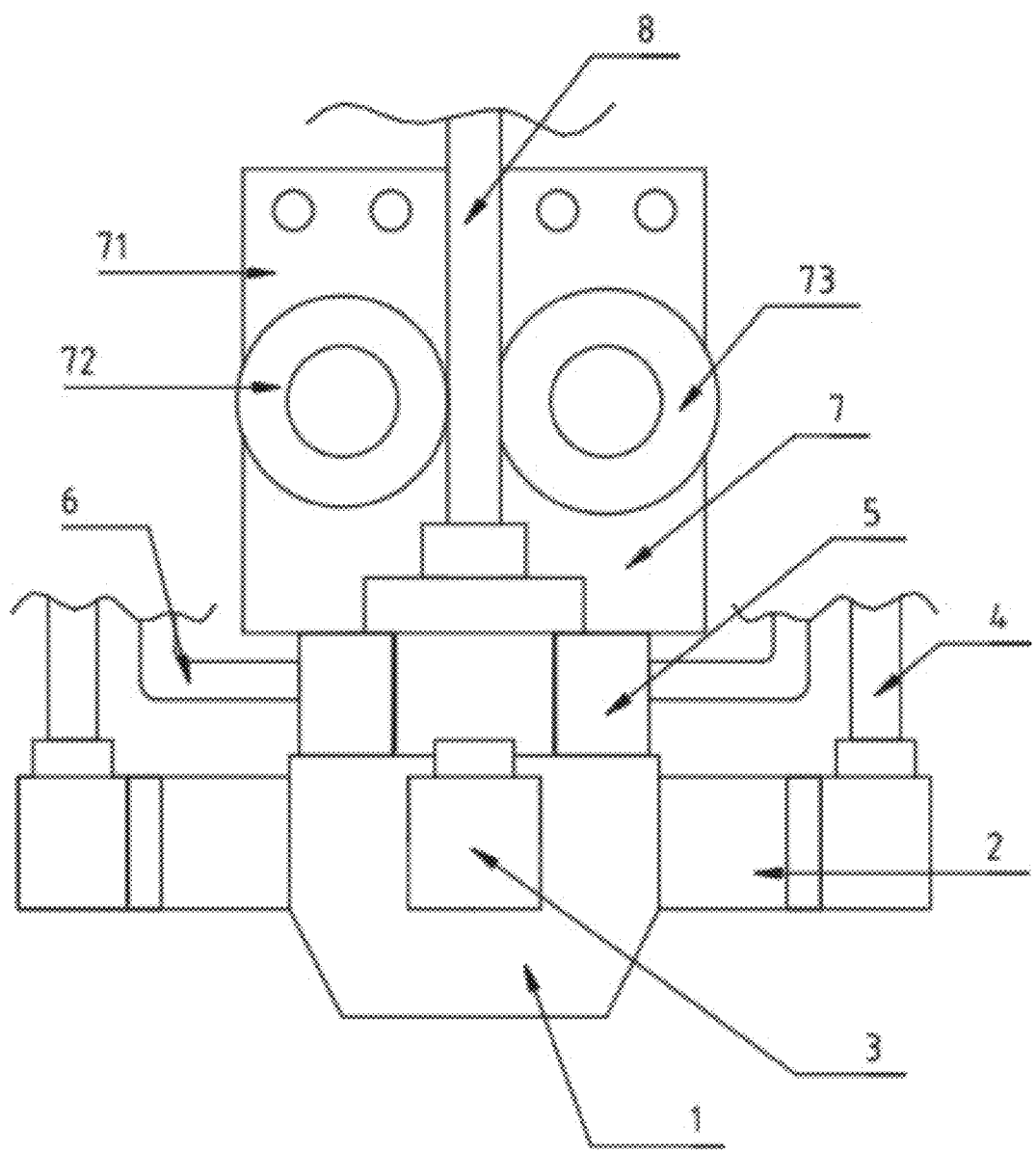
FIG. 9 is a schematic diagram illustrating an overall structure of a print head according to some embodiments of the present disclosure.

FIG. 9 is a schematic diagram illustrating an overall structure of a print head according to some embodiments of the present disclosure. FIG. 3 is a schematic diagram illustrating a cross-sectional structure of a print head body according to some embodiments of the present disclosure. FIG. 8 is a schematic diagram illustrating a structure of a print head body according to some embodiments of the present disclosure.

Combined with FIGS. 3, 8, and 9, a multi-mode 3D print head (hereinafter referred to as a print head) includes a print head body 1, the print head body 1 is provided with an extrusion hole 11, and the extrusion hole 11 is provided at a center position of the print head body 1. When a profile 8 is added to the extrusion hole 11, the print head heats and melts the profile 8, and discharges the profile 8 through an opening at a lower end of the extrusion hole 11, then cools down the melted profile 8 through a pre-set cooling structure (not shown in the drawings), completes a shaping of the melted profile 8, and executes an extrusion molding print. The extrusion hole 11 may be in a vertical form.

In some embodiments, a feeding mechanism includes a connecting frame removably connected to the print head body, the connecting frame is provided with a driving wheel for transporting profiles and a follower wheel opposite each other above the extrusion hole, and a spacing of the follower wheel and the driving wheel is adjusted based on a diameter of the profile.

In some embodiments, as shown in FIG. 3 and FIG. 9, the print head body 1 is designed in a manner that includes: a feeding mechanism 7 is provided above the extrusion hole 11, and the feeding mechanism 7 includes a connecting frame 71 detachably connected to the print head body 1. The print head body 1 and the connecting frame 71 are connected in various ways. For example, the connecting process is that a top of the print head body 1 is provided with an external thread, and the connecting frame 71 is provided with an internal thread, and the fixing is realized by the cooperation of the internal and external threads.

As shown in FIG. 3 and FIG. 9, the connecting frame 71 is provided with a driving wheel 72 and a follower wheel 73 for transporting the profile 8 opposite each other above the extrusion hole 11. The spacing of the follower wheel 73 and the driving wheel 72 is adjusted according to the diameter of the profile 8, e.g. the larger the diameter of the profile, the larger the spacing of the follower wheel and the driving wheel to clamp the profile.

The follower wheel 73 is capable of clamping the profile 8 and transporting the profile 8 downwardly, which be discharged by continuously adding the profile 8 to the extrusion hole 11. The profile 8 may be in a vertical shape.

In some embodiments, by setting up a driving wheel and a follower wheel and adjusting the spacing of the follower wheel and the driving wheel, it is possible to tighten the profile to avoid sliding of the profile while transporting the profile more easily.

In some embodiments, an annular groove is provided on a side of the print head body away from the feeding mechanism. The annular groove is disposed between the extrusion hole and the droplet ejection hole and is provided with a heating mechanism.

In some embodiments, as shown in FIG. 3 and FIG. 9, the print head body 1 is provided with an annular groove 15 on a side away from the feeding mechanism 7. The annular groove 15 is disposed between the extrusion hole 11 and a droplet ejection hole 13, and the annular groove 15 is provided with a heating mechanism. In some embodiments, the heating mechanism includes a heating wire, and the heating wire is provided in an annular shape and is embedded in the annular groove 15. Meanwhile, the annular groove 15 is provided in a position that allows the heating mechanism to simultaneously heat the droplet within the droplet ejection hole 13.

In some embodiments, it is possible to insulate the profile or heat the droplet by providing the annular groove between the extrusion hole and the droplet ejection hole and providing the heating mechanism.

Figure 2:
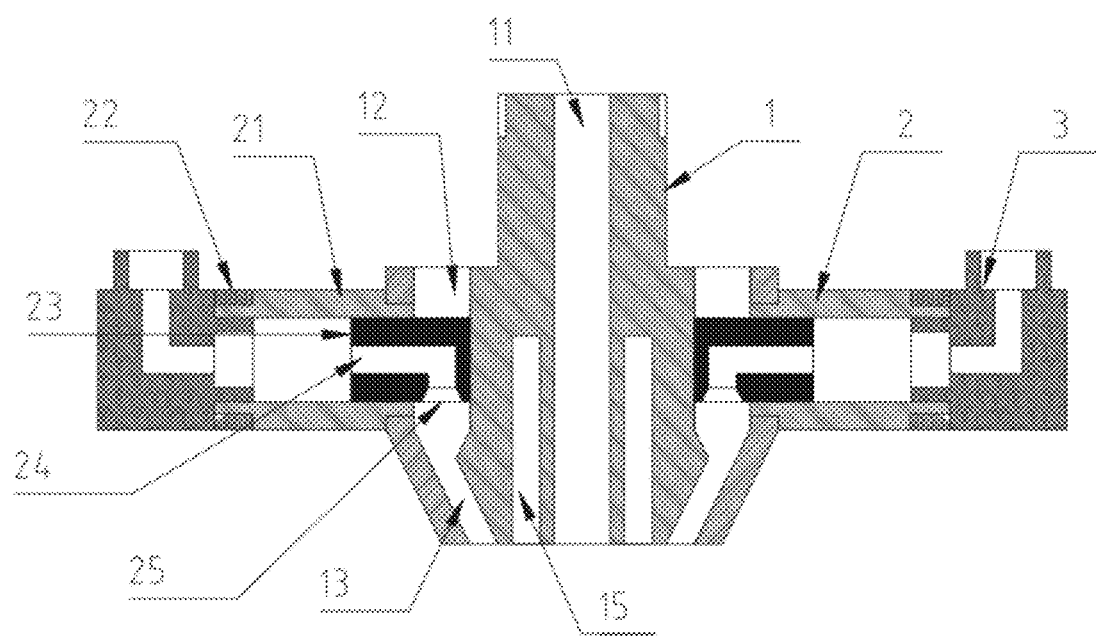
FIG. 2 is a schematic diagram illustrating a partially structured cross-sectional structure of a droplet ejection state according to some embodiments of the present disclosure.
Figure 6:
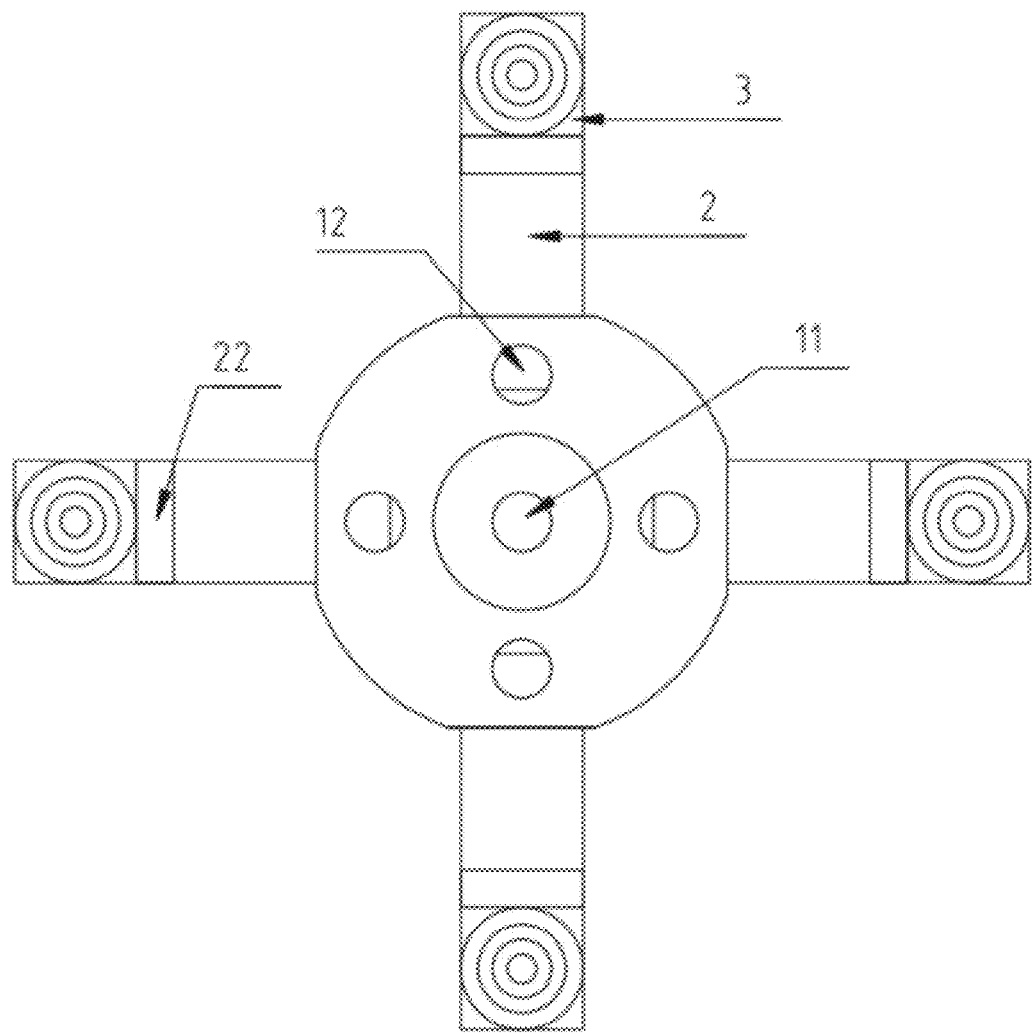
FIG. 6 is a schematic diagram illustrating a top-view structure of a print head body shown according to some embodiments of the present disclosure.
Figure 7:
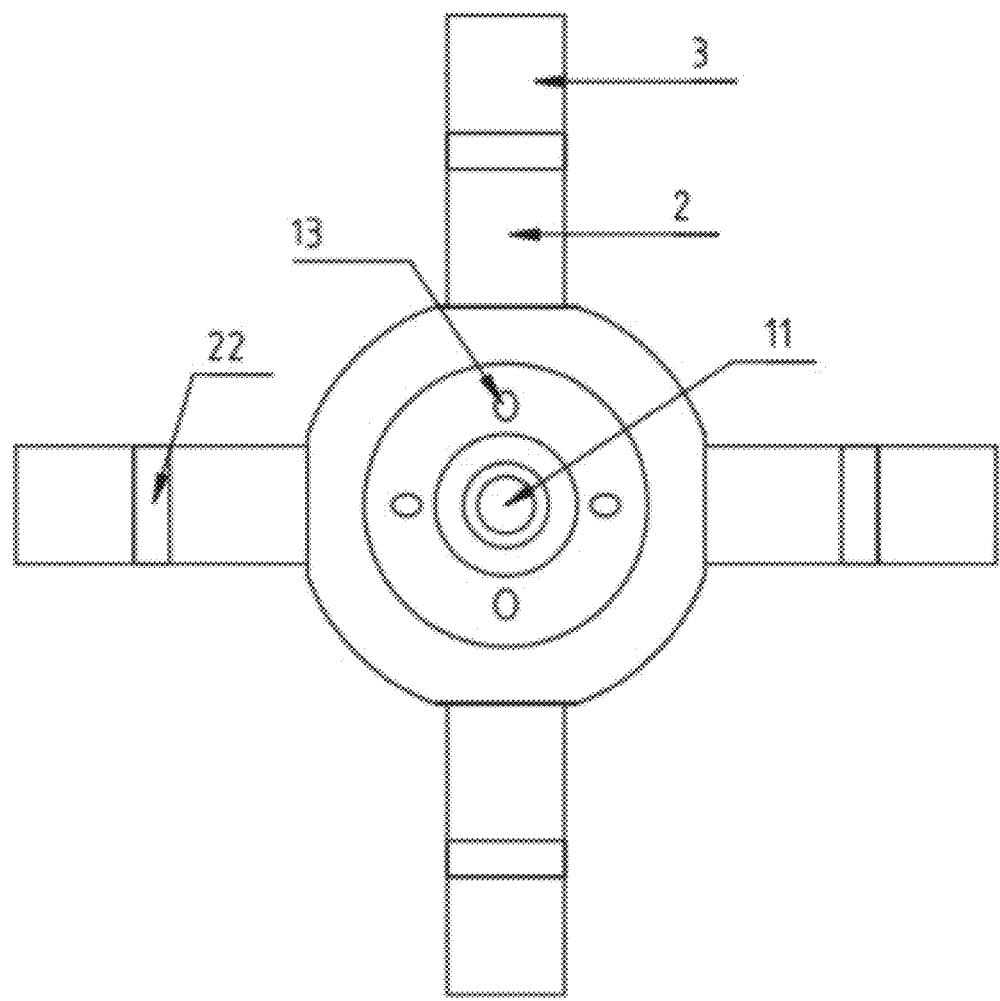
FIG. 7 is a schematic diagram illustrating an upward-view structure of a print head body according to some embodiments of the present disclosure.

FIG. 1 is a schematic diagram illustrating a partially structured cross-sectional structure of a droplet addition state according to some embodiments of the present disclosure. FIG. 2 is a schematic diagram illustrating a partially structured cross-sectional structure of a droplet ejection state according to some embodiments of the present disclosure. FIG. 6 is a schematic diagram illustrating a top-view structure of a print head body according to some embodiments of the present disclosure. FIG. 7 is a schematic diagram illustrating an upward-view structure of a print head body according to some embodiments of the present disclosure.

In some embodiments, in order to realize the droplet ejection printing using the same print head, as shown in FIG. 1, FIG. 2, FIG. 6, and FIG. 7, the print head body 1 is arranged with a plurality of droplet ejection holes 13 circumferentially along a center axis of the extrusion hole 11. It should be noted that a lower end of each of the droplet ejection holes 13 is provided inclined toward one end of the extrusion hole 11. The inclined setting allows the droplets in the droplet ejection hole 13 to be ejected to the underside of the extrusion hole 11. The lower end of each of the plurality of droplet ejection holes 13 is flush with the lower end of the extrusion hole 11, preventing the print head body from colliding with an intermediate product of the printing process during movement.

In some embodiments, since the droplet ejection holes 13 are required to eject the droplets through the airflow, to avoid the droplets being ejected to a position out of the preset position, the count of the droplet ejection holes 13 is set to be an even number and is set symmetrically about the extrusion hole 11 in two pairs. Through the interaction of the airflow, the droplets are accurately ejected through the droplet ejection holes 13 to the predetermined position to complete the printing process. The preset position refers to a position where the droplet needs to be ejected as set in a print program segment. More descriptions of the print program segment may be found in the related descriptions below.

In some embodiments, in order to accurately locate the predetermined position, an intersection point of straight lines in which the center axes of the plurality of the droplet ejection holes 13 are located directly below the extrusion hole 11 and in a straight line in which the center axis of the extrusion hole 11 is located. Therefore, a difference between an ejection position of the plurality of the droplet ejection holes 13 and an extrusion position of the extrusion hole 11 is only in the vertical direction, while there is no difference in the horizontal and vertical directions. It is only necessary to adjust a height of the print head body 1 when using the print head.

When a print program segment of extrusion molding is switched to a print program segment of droplet ejection by the controller, the print head body 1 needs to be lifted in height, and the height of the lift is a spacing between an opening at the lower end of the extrusion hole 11 and the intersection point. When the print program segment of droplet ejection is switched to the print program segment of extrusion molding by the controller, the print head body 1 needs to be lowered in height, and the lowered height is the same as the raised height.

The droplet ejection cannot be accomplished only by the droplet ejection holes 13, and the print head is also provided with a droplet addition structure and a jetting mechanism. In some embodiments, the droplet addition structure includes a droplet addition hole and an auxiliary side hole. The jetting mechanism includes an injection auxiliary component.

In some embodiments, the print head body 1 is further provided with a plurality of droplet addition holes 12 and auxiliary side holes 14 connected to the droplet ejection holes 13. An inner diameter of each droplet addition hole 12 is larger than an inner diameter of droplet ejection hole 13, thereby accomplishing the normal addition of the droplets.

In some embodiments, to realize droplet addition, one end of the droplet addition hole 12 away from the droplet ejection hole 13 is connected with a droplet addition tube 6. In order to realize quantitative addition of the droplets, a droplet addition seat 5 is also provided between the droplet addition tube 6 and the droplet addition hole 12. One end of the droplet addition tube 6 is connected with a fluid supply mechanism to provide the droplets required for printing.

In some embodiments, the plurality of auxiliary side holes 14 are disposed perpendicular to the plurality of droplet addition holes 12 and are detachably coupled with an injection auxiliary component 2, and when the injection auxiliary component 2 is coupled with the auxiliary side holes 14, the injection auxiliary component 2 is also perpendicular to the droplet addition hole 12.

Figure 4:
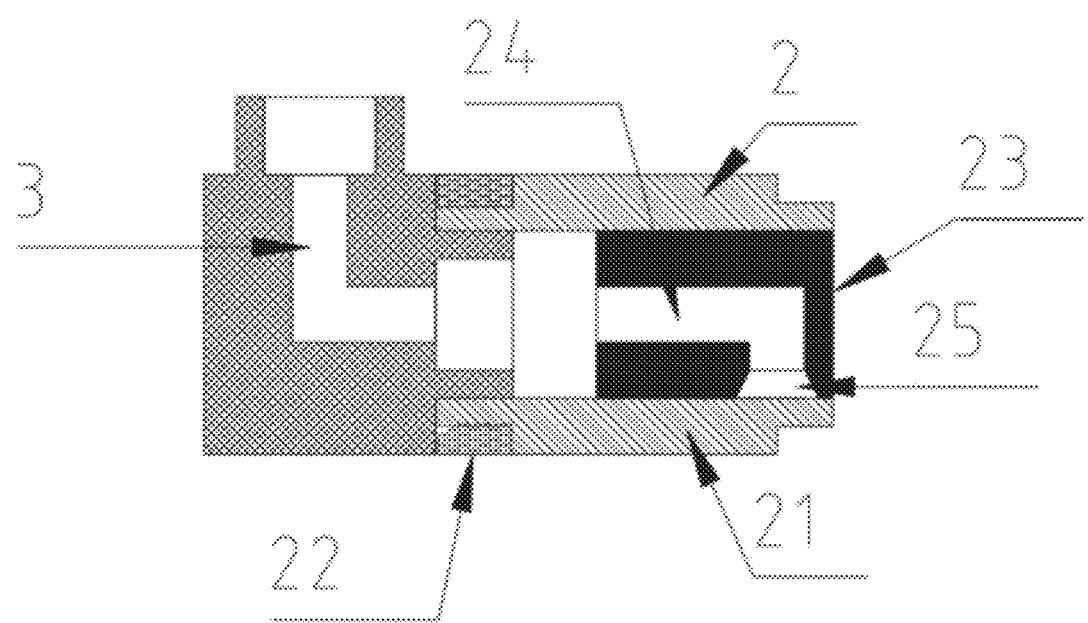
FIG. 4 is a schematic diagram illustrating a cross-sectional structure of an injection auxiliary component in a droplet addition state according to some embodiments of the present disclosure.
Figure 5:
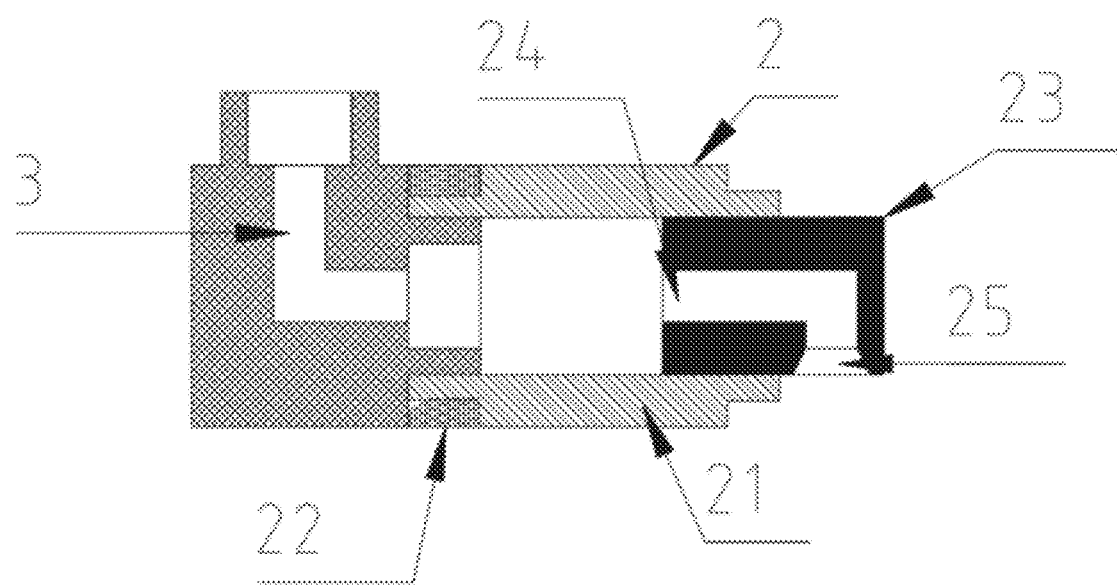
FIG. 5 is a schematic diagram illustrating a cross-sectional structure of an injection auxiliary component in a droplet ejection state according to some embodiments of the present disclosure.

FIG. 4 is a schematic diagram illustrating a cross-sectional structure of an injection auxiliary component in a droplet addition state according to some embodiments of the present disclosure. FIG. 5 is a schematic diagram illustrating a cross-sectional structure of an injection auxiliary component in a droplet ejection state according to some embodiments of the present disclosure.

In some embodiments, according to some embodiments of the present disclosure, as shown in FIGS. 4 and 5, the injection auxiliary component 2 includes a sleeve 21 fixed to the auxiliary side holes 14. The sleeve 21 is of a cylindrical structure, and a moving block 23 capable of moving is provided in the sleeve 21.

The moving block 23 is configured to truncate the droplet addition hole 12 by moving. To avoid leakage of the droplets from the gap, an outer surface of the moving block 23 is circumferentially tightened to an inner wall of the sleeve 21 to ensure a sealed connection with each other without leakage of the droplets or gas.

In some embodiments, according to some embodiments of the present disclosure, to realize driven injection of the droplets within the droplet ejection holes 13, the moving block 23 is further provided with an auxiliary ejection hole 24, the two openings of the auxiliary ejection hole 24 are provided toward the droplet ejection holes 13 and back away from the auxiliary side holes 14, and the airflow from the two openings is passed between the two openings.

In some embodiments, the injection auxiliary component 2 includes a cylindrical sleeve 21, and the sleeve 21 is provided with a rectangular hole along a length of the sleeve 21, and a width of the rectangular hole is the same as a length of a diameter of the droplet addition hole 12. The moving block 23 moves within the rectangular hole.

In some embodiments, the moving block 23 includes a rectangular segment and a semi-circular segment, the rectangular segment abuts circumferentially to the rectangular hole, the semi-circular segment has a diameter that is the same as the width of the rectangular hole, and the semi-circular segment inserts into the droplet addition hole 12 from the side and truncates the droplet addition hole 12. The rectangular segment is designed to avoid rotation of the moving block 23 during movement, to ensure that the outlet of the auxiliary ejection hole 24 is vertically downward and provide an aerodynamic force for the droplet ejection hole 13 to eject the droplets. The design of the semi-circular segment can truncate the droplet addition hole 12, which can prevent droplet backflow.

In some embodiments, the auxiliary ejection hole is in communication with the droplet ejection hole when the moving block truncates the droplet addition hole.

In some embodiments, according to some embodiments of the present disclosure, as shown in FIG. 2 and FIG. 9, to enable a jet actuation of the droplets within the droplet addition hole 12, the auxiliary ejection hole 24 is connected to the droplet ejection hole 13 when the moving block 23 truncates the droplet addition hole 12. One end of the auxiliary ejection hole 24 is connected with the air pipe 4. When the air pipe 4 is pressurized, the airflow is ejected from the other opening of the auxiliary ejection hole 24.

In some embodiments, the air pipe 4 is connected to one end of the sleeve 21 away from the auxiliary side hole 14, and one end of the air pipe 4 away from the sleeve 21 is connected with an air supply mechanism to provide a jetting power. The air supply mechanism includes an air compressor or the like.

When the print head is in use, the airflow from the air compressor may enter the sleeve 21, and the airflow pushes the moving block 23 to move when the openings of the auxiliary side holes 14 toward the droplet ejection holes 13 are covered by the sleeve 21. The moving block 23 truncates the droplet addition hole 12 by moving against an inner wall of the droplet addition hole 12. At the same time, the opening provided by the auxiliary side hole 14 back from the auxiliary side hole 14 is connected with the droplet ejection hole 13, and the airflow enters from the sleeve 21 and then is discharged from the opening provided by the auxiliary side hole 14 back from the auxiliary side hole 14 to realize the air jet. During the air jetting process, the airflow carries the droplets out to realize the droplet ejection printing.

In some embodiments, the auxiliary ejection hole is connected with the droplet ejection hole when the moving block truncates the droplet addition hole, which allows for convenient jet actuation of the droplets.

In some embodiments, the induction coil is configured to adsorb the moving block upon energization, and the adsorbed moving block is moved away from the droplet addition hole.

In some embodiments, to realize the addition of the droplets in a subsequent printing process, one end of the sleeve 21 away from the droplet addition hole 12 is provided with an induction coil 22. The induction coil 22 is configured to adsorb the moving block 23 when energized, and the adsorbed moving block 23 is moved away from the droplet addition hole 12, whereby the droplets flow from the droplet addition hole 12 into the droplet ejection hole 13. By alternating a process of airflow pushing the moving block to move and a process of adsorption of the moving block after the induction coil is energized, cyclic droplet ejection printing may be realized.

Since the moving block 23 needs to be attracted by the induction coil 22, the moving block 23 is made of a magnetic material, whereas other structures in the ejection auxiliary component 2, such as the sleeve 21, are made of non-magnetic materials.

In some embodiments, the induction coil 22 is connected with a power supply mechanism. The power supply mechanism is configured to power the induction coil.

In some embodiments, by setting the induction coil to adsorb the moving block, the adsorbed moving block is far away from the droplet addition holes, which can realize a rapid movement of the moving block while at the same time ensuring that the moving block takes the same amount of time each time it moves, thereby improving the accuracy of printing.

In some embodiments, the inner diameter of the auxiliary ejection hole 24 is larger than the inner diameter of the droplet ejection hole 13.

The opening of the droplet ejection hole 13 may be any feasible shape. For example, the opening is a flare 25. As another example, the opening is a round mouth.

Figure 10A:
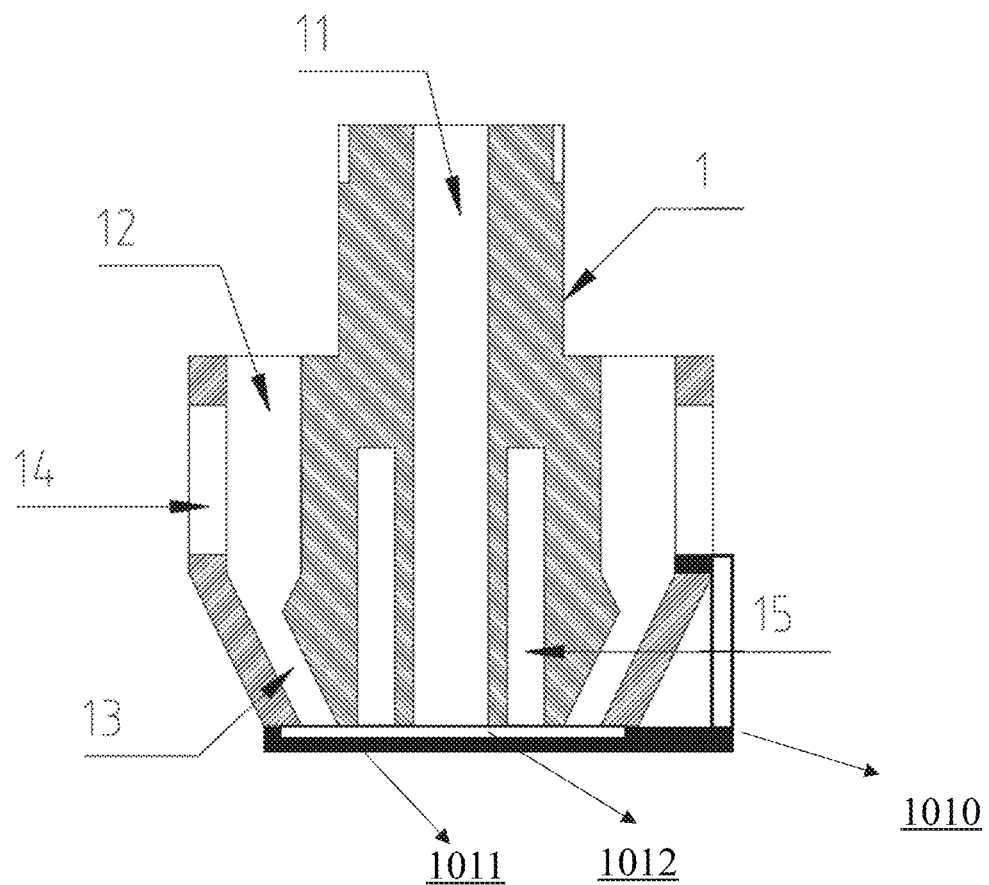
FIG. 10A is a schematic diagram illustrating a structure of an adhesive collection component according to some embodiments of the present disclosure.

In some embodiments, the inner diameter of the auxiliary ejection hole is larger than the inner diameter of the droplet ejection hole, which can enhance the air pressure of the spray, and the opening near the droplet ejection hole is a flared mouth, which avoids the phenomenon of the droplet backflow when the droplet is sprayed, and at the same time avoids the phenomenon that droplets are sprayed to the corners and cannot be sprayed normally from the droplet ejection hole.

A connecting segment between the droplet addition hole 12 and the droplet ejection hole 13 is a segment that may be any feasible shape. For example, the connecting segment is a conical segment. As another example, the connecting segment is a cylindrical segment.

The droplets enter the droplet ejection hole 13 with the airflow and are ejected.

In some embodiments, in the machining of the print head body 1, an upper half of the droplet addition hole 12 is machined by a circular drill, and the droplet ejection hole 13 is machined by a circular drill with a relatively small diameter, which are not connected at this time; and a lower part of the droplet addition hole 12 is connected to the droplet ejection hole 13 by a conical drill.

In some embodiments, a connecting segment between the droplet addition hole and the droplet ejection hole is a conical segment, which enables pooling of droplets and prevents the accumulation of droplets.

In some embodiments, to avoid droplets from entering the sleeve 21 of the injection auxiliary component 2, the diameter of the droplet addition hole 12 is larger than the diameter of the droplet ejection hole 13.

One end of the droplet addition hole 12 away from the droplet ejection hole 13 provided at an inclined angle toward the extrusion hole 11 includes a plurality of angle ranges. For example, the inclination angle is 0°-45°. As another example, the inclination angle is 10°-35°. As a further example, the inclination angle is 20°-25°.

In some embodiments, one end of the droplet addition hole away from the droplet ejection hole is provided at an inclination to the extrusion hole, which can ensure that the droplets accurately enter into the droplet ejection hole 13 after being added from the droplet addition hole 12.

FIG. 10A is a schematic diagram illustrating a structure of an adhesive collection component according to some embodiments of the present disclosure. FIG. 10B is a schematic diagram illustrating the adhesive collection component being rotated according to some embodiments of the present disclosure.

In some embodiments, as shown in FIG. 10A, the print head body further includes an adhesive collection component 1010.

The adhesive collection component is configured to remove residual extrusion molding adhesive below the extrusion hole. In some embodiments, the adhesive collection component is provided below the print head body. The extrusion molding adhesive is an adhesive used for extrusion molding print.

In some embodiments, as shown in FIG. 10A, the adhesive collection component includes a scraping blade 1011 and a glue collecting box (not shown in the figure).

The scraping blade is configured to scrape away the residual extrusion molding adhesive below the extrusion hole. In some embodiments, the scraping blade scrapes the residual extrusion molding adhesive below the extrusion hole by rotating. As shown in FIG. 10A, a groove 1012 is provided on the scraping blade.

The groove 1012 is configured to avoid dripping of the adhesive. It should be appreciated that the adhesive liquid on the scraping blade may accumulate in a groove to avoid dripping directly from the scraping blade.

The glue collecting box is configured to temporarily store adhesive on the scraping blade. In some embodiments, the glue collecting box is provided in a path of rotation of the scraping blade and parallel to the scraping blade. The glue collecting box is provided with a cleaning brush, such as a cleaning brush or a motorized cleaning brush, or the like.

The glue collecting box is provided with an opening adapted to a size of the scraping blade, and when the scraping blade enters the opening of the glue collecting component by rotation, the cleaning brush inside the glue collecting box contacts the scraping blade to clean the residual extrusion molding adhesive from the scraping blade into the glue collecting box.

In some embodiments, the glue collecting box is configured with a gravity sensor. The gravity sensor is configured to detect residual adhesive amount within the glue collecting box. The residual adhesive amount is a volumetric amount of extrusion molding adhesive temporarily stored in the glue collecting box.

In some embodiments, the gravity sensor communicates with the processor. Each time the scraping blade rotates, the gravity sensor detects the residual adhesive amount in the glue collecting box once and sends the residual adhesive amount to the processor. More descriptions of the processor obtaining the residual adhesive amount may be found in 1140 and related descriptions.

Figure 10B:
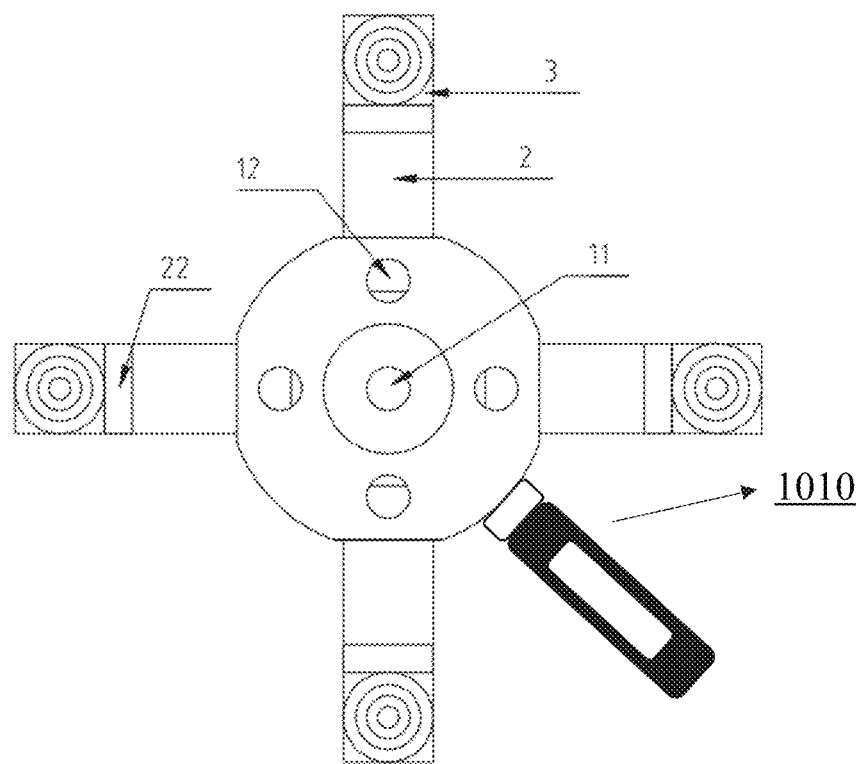
FIG. 10B is a schematic diagram illustrating an adhesive collection component being rotated according to some embodiments of the present disclosure.

In some embodiments, the adhesive collection component is rotated relative to the print head body, moving to a side away to the print head body, as shown in FIG. 10 B.

In some embodiments, the residual extrusion molding adhesive below the extrusion hole can be removed in a timely manner by the provision of the adhesive collection component, while the adhesive collection component can be rotated to the side away to the print head body to facilitate the cleanup of the residual adhesive collected by the adhesive collection component.

In some embodiments, the print head body further includes a cooling component. The cooling component includes a gas cooler or the like.

The cooling component is configured to cool gas flowing from the gas pipe. In some embodiments, the cooling component is provided around the gas pipe. For example, the cooling component is provided around the gas pipe, or the like.

According to some embodiments of the present disclosure, by providing the cooling component to cool the gas inflow from the gas pipe, the cooled gas may be utilized to cool the print area and promote molding of the printed part when extrusion molding print is performed.

In some embodiments, the multi-mode 3D print head further includes a processor and a controller.

The processor may be configured to process data from at least one component of the multi-mode 3D print head or an external data source. In some embodiments, the processor includes a printing platform. The printing platform is a virtual platform that aids in printing. The printing platform is configured to obtain a three-dimensional model and profile material to be printed.

In some embodiments, the processor includes a central processing unit (CPU), an application-specific integrated circuit (ASIC), an image processing unit (GPU), a physical operations processing unit (PPU), a microprocessor, or any combination thereof. The processor is configured to perform a three-dimensional model slicing to obtain a to-be-printed slice of the model. The processor is also configured to determine a print program segment for droplet ejection and a print program segment for extrusion molding based on the amount of the profile material and the size of the three-dimensional model.

In some embodiments, a storage member is configured within the processor. The storage member is configured to store data related to historical print jobs performed by the print head, such as a material feature of the historical printed slice.

In some embodiments, a fusion model is configured within the processor. More descriptions of the fusion model may be found in FIG. 12 and related descriptions.

In some embodiments, the multi-mode 3D print head further includes a plurality of temperature sensors. The temperature sensors are configured to capture temperature information. The temperature information includes ambient temperature of the print head and temperature of the extrusion hole.

In some embodiments, the temperature sensors are deployed around the extrusion hole or on the print head body of the print head. The temperature sensors are also deployed in any feasible location on the print head, which is not limited by the present disclosure.

The controller may be configured to execute a print program segment sent by the processor. In some embodiments, the controller is configured to perform the print program segment for droplet ejection and the print program segment for extrusion molding. The controller includes a program counter, an instruction register, an instruction decoder, and a timing generator, or any combination thereof.

In some embodiments, it is possible to carry out extrusion molding printing of some materials through the feeding mechanism in conjunction with the extrusion holes, and it is also possible to carry out droplet ejection printing of other materials through the injection auxiliary component in conjunction with the droplet ejection holes, and the adjustment process may be accomplished by moving only the height of the print head body, so the printing efficiency is higher compared to existing structures.

Figure 11:
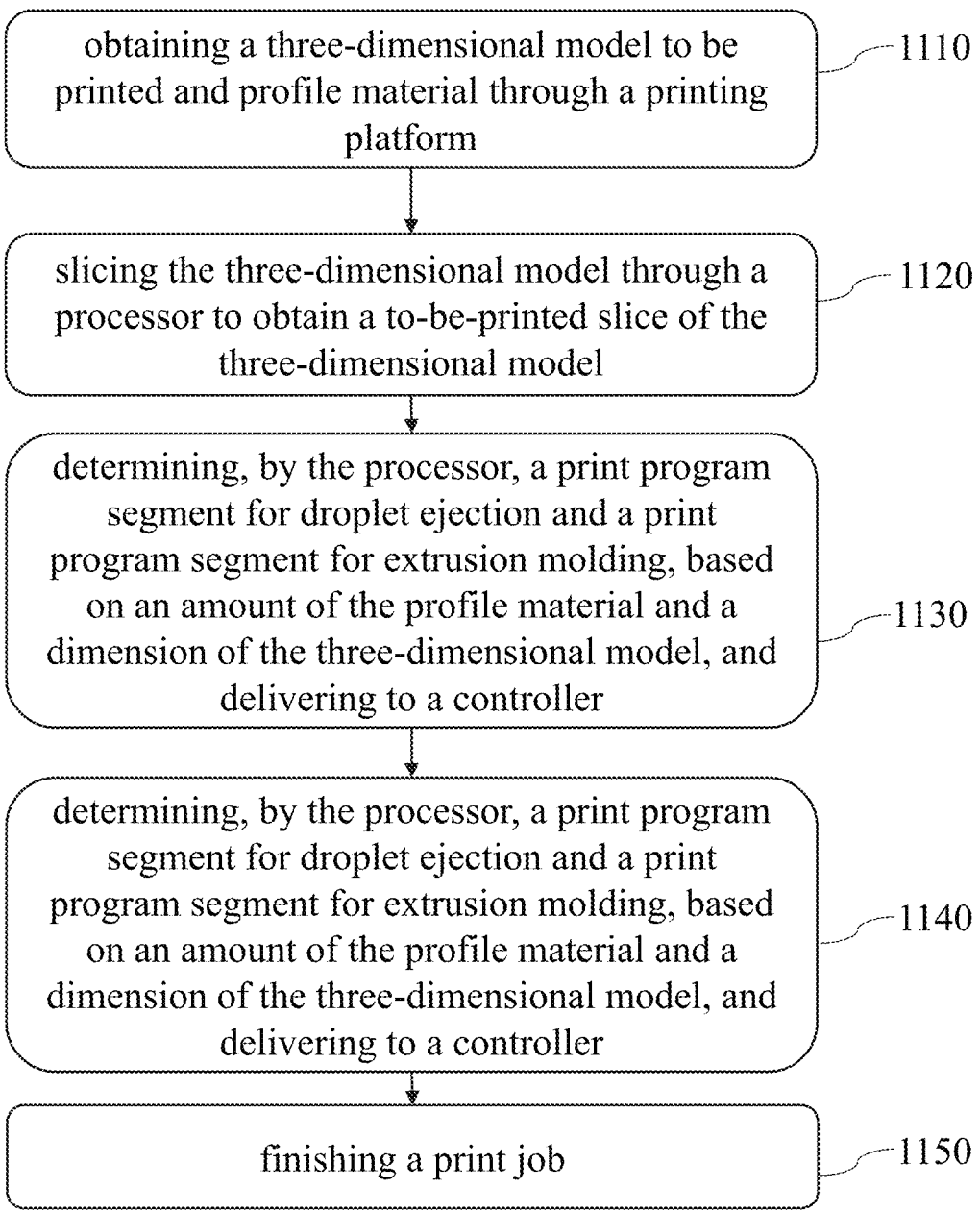
FIG. 11 is an exemplary flowchart illustrating a collaborative printing process for a multi-mode 3D print head according to some embodiments of the present disclosure.

FIG. 11 is an exemplary flowchart illustrating a collaborative printing process for a multi-mode 3D print head according to some embodiments of the present disclosure. In some embodiments, a process 1100 is performed by a multi-mode 3D print head (hereinafter referred to as the print head). As shown in FIG. 11, the process 1100 includes the following operations.

In some embodiments, the print head obtains a three-dimensional model to be printed and a profile material through a printing platform, slices the three-dimensional model through a processor, obtains a to-be-printed slice of the three-dimensional model, and determines, by the processor, a print program segment for droplet ejection and a print program segment for extrusion molding based on an amount of the profile material and a dimension of the three-dimensional model, and conveys the print program segment for droplet ejection and the print program segment for extrusion molding to the controller. The controller runs the print program segment for droplet ejection and the print program segment for extrusion molding sequentially to complete the printing. A compensation program is provided between the print program segment for droplet ejection and the print program segment for extrusion molding.

In 1110, a three-dimensional model to be printed and a profile material are obtained through a printing platform.

More descriptions of the printing platform may be found in FIG. 9. The printing platform may also be referred to as the software virtual printing platform.

The three-dimensional model to be printed is a three-dimensional model that the print head needs to print.

The profile material is information related to the profile material used to print the three-dimensional model. In some embodiments, the profile material includes the type and amount of profile material, or the like. The type of profile material includes polyethylene, polyurethane, or the like.

In some embodiments, the print head utilizes multiple ways to obtain the three-dimensional model to be printed and the profile material through the printing platform. For example, the print head obtains the three-dimensional model to be printed and the profile material from a third-party software (e.g., modeling software, etc.) via the printing platform. As another example, the user may send the three-dimensional model to be printed and the profile material through a terminal device directly to the printing platform. The terminal device includes a smartphone, a tablet, or the like.

In 1120, the three-dimensional model is sliced through the processor to obtain a to-be-printed slice of the three-dimensional model.

The processor may also be configured to slice the three-dimensional model using the software in the processor to obtain the to-be-printed slice of the three-dimensional model.

The three-dimensional model slicing is a process of dividing the three-dimensional model to be printed into multiple thin layers, and the process also includes calculating a route to be followed by the print at each thin layer. The to-be-printed slice is the thin layer of the model that is obtained by slicing the three-dimensional model.

In some embodiments, the processor slices the three-dimensional model to be printed utilizing a variety of ways to obtain the to-be-printed slice. For example, the processor may utilize the third-party software (e.g., 3D slicing software, etc.) to slice the three-dimensional model to obtain the to-be-printed slice. As another example, the processor may perform the three-dimensional model slicing to obtain the to-be-printed slice by slicing parameters pre-set by the user. The slicing parameters refer to parameters related to the slicing operation, such as the print quality, the print speed, and the layer height.

More descriptions of the processor may be found in FIG. 9 and related descriptions.

In 1130, a print program segment for droplet ejection and a print program segment for extrusion molding are determined by the processor based on an amount of profile material and the size of the three-dimensional model and the print program segment for droplet ejection and the print program segment for extrusion molding are delivered to the controller.

The print program segment for droplet ejection is a print program segment that executes droplet ejection. The print program segment for extrusion molding is the print program segment that executes extrusion molding. The print program segment is the program that runs when the print head performs a print operation.

In some embodiments, the print program segment of the droplet ejection is configured to control an air supply mechanism with one end of the air pipe 4 away from the connecting member 3 and the power supply mechanism with one end of the droplet addition tube 6 away from the droplet addition seat 5 and the induction coil 22.

The print program segment for droplet ejection includes controlling a fluid supply mechanism to provide droplets through the droplet addition tube 6, and turning on the air supply mechanism to provide airflow after the droplets enter the lower end of the droplet addition hole 12. Under an action of the airflow, the moving block 23 moves to an inner wall of the droplet addition hole 12 to cut off the droplets while the airflow continues to be ejected from the auxiliary ejection holes 24 proximate to the opening of the droplet ejection hole 13 and carries the droplets from the droplet ejection hole 13.

The print program segment for droplet ejection further includes turning off the air supply mechanism, turning on the power supply mechanism to supply power to the induction coil 22, energizing the induction coil 22 to adsorb the moving block 23, and the moving block 23 moves away from the droplet addition hole 12. The print program segment for droplet ejection further includes alternately turning on or off the power supply mechanism and the air supply mechanism to complete the droplet ejection printing.

The print program segment for droplet ejection also includes an injection cycle. The injection cycle is a period of time during which droplet ejection hole performs a cyclic droplet ejection print. In some embodiments, the injection cycle includes a period of time for the droplet ejection hole to perform the cyclic droplet ejection printing and a point in the cycle at which airflow is required to propel a moving block and a point in time at which an induction coil is required to be energized to adsorb the moving block.

The injection cycle may be determined by user entry or the like. More descriptions of the cyclic droplet ejection type may be found in FIG. 9 and related descriptions.

In some embodiments, the print program segment for extrusion molding is configured to control the feeding mechanism 7 and the heating mechanism within the annular groove 15. The print program segment for extrusion molding includes controlling the heating mechanism to continually heat the profile material based on the printing temperature and controlling the feeding mechanism 7 to continually add the profile material to complete the extrusion molding print. The printing temperature is temperature of the extrusion hole during the extrusion molding print. The printing temperature may be determined by user entry.

The print program segment for extrusion molding also includes a controlled cooling structure to cool the melted profile material to accelerate the molding of the profile material.

In some embodiments, the processor determines, based on the amount of profile material and the size of the three-dimensional model, the print program segment for droplet ejection and the print program segment for extrusion molding and execution sequence of the two print program segments. The execution sequence of the two print program segments includes a sequence of the two print program segments and a number of times that the two print program segments are executed alternately. More descriptions of the amount of profile material may be found in operation 1110 and related descriptions.

For example, the processor, based on the amount of profile material and the size of the three-dimensional model, uses the print program segment for extrusion molding at locations where the profile material is used in large amounts and the size of the three-dimensional model is large, and uses the print program segment for droplet ejection at locations where the profile material is used in small amounts and the three-dimensional model size is small. The size of the three-dimensional model may be obtained by the processor based on the three-dimensional model or through third-party software.

Understandably, the locations where the profile material is used in large amounts and the size of the three-dimensional model is large may tend to require less finesse and may use a print program segment with relatively fast print speed (e.g., the print program segment for extrusion molding). The position where the profile material is used in small amounts and the size of the three-dimensional model is small may tend to have a relatively high requirement for fineness and may use a print program segment for droplet ejection with a relatively high print fineness.

In some embodiments, the processor delivers the print program segment for droplet ejection and the print program segment for extrusion molding and the execution sequence of the two print program segments to the controller.

In 1140, the print program segment for droplet ejection and the print program segment for extrusion molding are run sequentially through the controller.

More descriptions of the controller may be found in the related descriptions above.

In some embodiments, the controller runs the print program segment for droplet ejection and the print program segment for extrusion molding sequentially to carry out a printing job on the three-dimensional model. The sequential running refers to following the execution sequence of the two print program segments determined by the processor.

In some embodiments, in response to the controller switching the print program segment for droplet ejection to the print program segment for extrusion molding, the processor, based on a material feature of the to-be-printed slice and a printing temperature in the print program segment for extrusion molding, updates an injection cycle in the droplet ejection print program segment. The processor determines an operating frequency of the induction coil based on the updated injection cycle and sends the operating frequency to the controller. The controller, based on the operating frequency, controls the induction coil to be energized. More descriptions of the printing temperature and the injection cycle may be found in operation 1130 and related descriptions.

It should be appreciated that after execution of the print program segment for extrusion molding, temperature of an intermediate product of the printing process is the same or similar to the printing temperature in the print program segment for extrusion molding. At this time, the execution of the print program segment for droplet ejection which is originally set may affect the printing accuracy of the intermediate product. Therefore, based on the material feature of the to-be-printed slice and the printing temperature in the print program segment for extrusion molding, the injection cycle in the print program segment for droplet ejection is updated to reduce the influence of the temperature of the intermediate product on the subsequent droplet ejection printing.

The material feature is a material feature of an actual profile corresponding to the to-be-printed slice. In some embodiments, the material feature includes at least one of a solidification rate, a density, and a viscosity of the actual profile corresponding to the to-be-printed slice.

In some embodiments, the material feature is obtained by user entry.

In some embodiments, the processor updates the injection cycle in multiple ways based on the material feature and the printing temperature. For example, the processor, based on the material feature and the printing temperature, queries a reference injection cycle corresponding to the material feature and the printing temperature in a first preset table, determines the reference injection cycle as an updated injection cycle, and uses the updated injection cycle to overwrite the injection cycle in the print program segment for droplet ejection. The first preset table is pre-set by the technician based on historical experience, and the first preset table includes a plurality of sets of material features and printing temperatures and a reference injection cycle corresponding to each set of material features and printing temperatures.

In some embodiments, the print head also updates the injection cycle in the print program segment for the droplet ejection by a fusion model within the processor. More descriptions of this section may be found in FIG. 12 and related descriptions.

In some embodiments, the processor determines the operating frequency of the induction coil based on the updated injection cycle. For example, the processor counts time points in the updated injection cycle at which the induction coil needs to be energized to adsorb the moving block, determines a time interval between the two time points as the operating frequency of the induction coil, and energizes the induction coil once for each elapsed time interval.

In some embodiments, the processor sends the operating frequency to the controller to control the induction coil to be energized via the controller based on the operating frequency when executing the print program segment for droplet ejection.

In some embodiments, since the printing temperature in the print program segment for extrusion molding may affect the subsequent droplet ejection printing, the process of updating the injection cycle based on the material feature and the printing temperature and determining the operating frequency based on the updated injection cycle can reduce the influence of the preceding print program segment on the subsequent droplet ejection printing.

In some embodiments, in response to the controller switching from the print program segment for droplet ejection to the print program segment for extrusion molding, the processor determines a droplet volume for the injection cycle based on the thickness of the to-be-printed slice, the material feature, and the printing temperature. The processor determines, based on the droplet volume amount, current data for the induction coil and sends the current data to the controller. The controller controls the induction coil to energize based on the current data.

The thickness of the to-be-printed slice is a layer height of the to-be-printed slice. In some embodiments, the processor utilizes a sizing tool to size the to-be-printed slice to obtain the thickness of the to-be-printed slice. The sizing tool includes a sizing tool that comes with the processor or a sizing tool from the third-party software.

The droplet volume for the injection cycle is a volume of droplets flowing into the droplet ejection holes during the injection cycle.

In some embodiments, the processor determines a droplet volume amount for the injection cycle based on the thickness of the to-be-printed slice, the material feature, and the printing temperature. For example, the processor constructs a target feature vector based on the thickness of the to-be-printed slice, the material feature, and the printing temperature, clusters a target feature vector with a plurality of clustering feature vectors to obtain a target cluster, calculates a mean value of the droplet volumes corresponding to all clustering feature vectors in the target cluster, and determines the obtained mean value as the droplet volume amount of the injection cycle. The target cluster refers to a clustering cluster that contains the target feature vector. Types of clustering algorithm include various types. For example, the clustering algorithm includes K-Means (K-means) clustering, or the like.

The clustering feature vector is a feature vector used for clustering. In some embodiments, the processor constructs a plurality of clustering feature vectors based on multiple historical printing processes in the historical data. For example, the processor selects, based on a single historical print process, a print program segment for droplet molding with a best print quality, and constructs a clustering feature vector using the thickness of the historical to-be-printed slices, the historical material feature, and historical printing temperature before performing the print program segment and the historical droplet volume amount of the print program segment.

The print quality may be determined by a technician based on historical assessment. For example, after executing the print program segment for droplet molding, the technician may evaluate the print accuracy and the count of internal pores of the intermediate product, identify an intermediate product with a highest print accuracy and a lowest count of internal pores as the intermediate product with the best print quality, and identify the print program segment corresponding to the intermediate product as a print program segment with best print quality.

The current data is data related to a current of the induction coil. In some embodiments, the current data includes a current magnitude, a duration of energization, or the like.

In some embodiments, the processor determines the current data for the induction coil based on the droplet volume. For example, the processor calculates a ratio of the droplet volume amount to a unit droplet flow rate, obtains a distance moving by the moving block, and determines the current data by a correspondence between the distance and the current data. The unit droplet flow rate refers to a volume amount of droplets flowing into the droplet ejection hole within a unit moving distance of the moving block. In some embodiments, the unit droplet flow rate is statistically determined by a skilled person through multiple practices.

The correspondence between the moving distance and the current data may be pre-set based on historical experience. For example, the longer the distance traveled, the higher the current magnitude and the longer the duration of energization.

In some embodiments, the processor sends the current data to the controller to control the induction coil to be energized via the controller based on the current data when executing the print program segment for droplet ejection.

In some embodiments, while updating the injection cycle, the droplet volume for the injection cycle is updated simultaneously, which in turn determines the current data and further reduces the impact of the preceding print program segment on subsequent droplet ejection printing.

In some embodiments, in response to switching the print program segment via the controller, determining, via the processor, a heating power of a heating mechanism in an annular groove based on the residual adhesive amount in the adhesive collection component and the material feature of the historical printed slice, and sending the heating power to the controller. The controller, based on the heating power, controls the heating mechanism to heat.

It is understood that when the print program segment is executed, due to the high printing temperature, which results in the extrusion hole discharging too fast, and consequently, the residual adhesive amount in the adhesive collection component is high, it may be necessary to adjust the heating power of the heating mechanism.

More descriptions of the residual adhesive amount may be found in FIG. 9 and related descriptions.

The historical printed slice refers to a to-be-printed slice corresponding to the print program segment executed by the controller before the controller switches the print program segment.

In some embodiments, the processor determines, based on the residual adhesive amount, a discharge speed in the extrusion hole, queries a reference heating power in a second predetermined table corresponding to the discharge speed and the material feature based on the discharge speed and the material feature of the historical printed slice, and determine a reference heating power as the heating power of the heating mechanism. The discharge speed refers to a flow rate of the extrusion molding adhesive discharged from the extrusion hole. The material feature of the historical printed slice may be accessed through the storage member. More descriptions of the storage member may be found in FIG. 9 and related descriptions The second preset table is pre-set based on historical data, including a plurality of groups of discharge speeds and material features and a reference heating power corresponding to each group of discharge flow rates and material features. The processor may count the residual adhesive amount after the controller switches the print program segment in the historical data, and determine a heating power corresponding to a print program segment with the least residual adhesive amount as the reference heating power.

In some embodiments, the processor determines a ratio of the residual adhesive amount added after one rotation of the scraping blade to the unit time as the discharge speed. The unit time is a time it takes for the scraping blade to rotate once, and the unit time is determined by a working parameter of the scraping blade.

Understandably, due to a fast rotational speed of the scraping blade and less contact with the extrusion hole, the discharge speed can be expressed by the ratio of the residual adhesive amount in the glue collecting box to the unit time.

In some embodiments, the processor sends the heating power to the controller to control the heating mechanism for heating via the controller based on the heating power.

In some embodiments, the residual adhesive amount and the material feature of the historical printed slice are used to determine whether a heating temperature of a preceding print program segment is appropriate, and the heating power of the heating mechanism may be adjusted in a timely manner to thereby improve the printing quality.

In some embodiments, in response to switching the print program segment via the controller, a heating duration for the heating mechanism is determined via the processor based on the heating power, the material feature, the temperature information, and the droplet volume amount, and the heating duration is sent to the controller. The controller controls the heating mechanism to heat based on the heating duration and the switching time point. The material feature here is a material feature of the current to-be-printed slice. More descriptions of the temperature information may be found in FIG. 9 and related descriptions.

The heating duration is a time length that the heating mechanism carries out the heating operation.

In some embodiments, the processor determines the heating duration in a variety of ways based on the heating power, the material feature, temperature information, and the droplet volume. For example, the processor constructs a vector to-be-matched based on the heating power, the material feature, the temperature information, and the droplet volume amount, matches a plurality of reference vectors that satisfy a predetermined matching condition through a vector database, calculates a mean value of labels of multiple reference vectors, and determined the obtained mean value as the heating duration. The label of the reference vector is a reference heating duration. The preset matching condition includes a similarity of the vectors being greater than a similarity threshold. The similarity threshold is preset based on historical experience. The similarity threshold is negatively correlated with a vector distance. The vector distance includes an Euclidean distance or the like.

The vector to be matched is a feature vector constructed based on the heating power, the material feature, the temperature information, and the droplet volume. The reference vector is a feature vector constructed based on the historical heating power, historical material feature, historical temperature information, and historical droplet volume.

In some embodiments, the processor calculates a difference between an actual temperature of the extrusion hole and a printing temperature in the print program segment before starting the print program segment in the historical printing process, selects a print program segment corresponding to a printing temperature with smallest difference, and constructs a reference vector based on the historical heating power, historical material feature, historical temperature information, and historical droplet volume corresponding to the print program segment, wherein an actual heating duration of the print program segment is used as a label of the reference vector.

In some embodiments, in response to the controller switching the print program segment, the processor determines the heating duration based on the heating power, the material feature, the temperature information, the droplet volume amount, and the cooling power of the cooling component.

In some embodiments, in response to each switching of the print program segment by the controller, the processor is configured to determine the heating duration.

In some embodiments, the vectors to be matched constructed by the processor include a cooling power, the reference vectors in the vector database include a historical cooling power, and the processor matches a plurality of reference vectors that satisfy the preset matching condition through the vector database, calculates the plurality of labels of the reference vectors, calculates the mean value of the labels of the multiple reference vectors, and uses the obtained mean value as the heating duration. The cooling power is a power with which the cooling component operates. The historical cooling power is obtained through the storage member. More descriptions of the cooling component may be found in FIG. 9 and related descriptions.

In some embodiments, since the cooled gas may periodically flow through the droplet ejection holes, which to a certain extent affects the heating efficiency of the heating mechanism, considering the cooling power of the cooling component when determining the heating duration can determine a more suitable heating duration to ensure the print quality.

In some embodiments, the processor sends the heating duration to the controller to control the heating mechanism to heat based on the heating duration via the controller.

In some embodiments, by timely adjusting the heating duration of the heating mechanism, it is possible to ensure that the actual temperature of the extrusion hole is the same as the printing temperature, and thus improve the printing quality.

In some embodiments, due to a height gap between the print positions of the droplet ejection type printing and the extrusion molding type printing, a compensation program is provided between the print program segment for the droplet ejection and the print program segment for the extrusion molding.

The compensation program is configured to make adjustment to the height of the print head body.

In some embodiments, the compensation program includes a height adjustment program. The height adjustment program is configured to adjust the height of the print head body. The height adjustment program includes a height to be adjusted.

In some embodiments, the compensation program further includes a related program such as a height confirmation program. The height confirmation program is configured to confirm that the height of the print head body is adjusted to a height consistent with the height to be adjusted.

The adjustment height is a height at which the print head needs to be raised or lowered while alternately executing two print program segments. In some embodiments, the adjustment height is the same as a spacing between a lower end of the extrusion hole 11 and an intersection of the plurality of droplet ejection holes 13.

In some embodiments, by setting up the compensation program to adjust the height of the print head according to the height difference of the specific printing position, a misalignment between the print program segment for the droplet ejection and the print program segment for the extrusion molding can be avoided at the printing position. The synchronization of the printing position is guaranteed, and the magnitude of the adjustment does not need to be calculated, and the printing efficiency is extremely high.

In 1150, a printing job is finished.

In some embodiments, by using a multi-mode 3D print head and a collaborative printing method applying the same, it is possible to realize automatic conversion of printing modes and adaptive adjustment of the height of the print head, which enables printing efficiency to be greatly improved.

Figure 12:
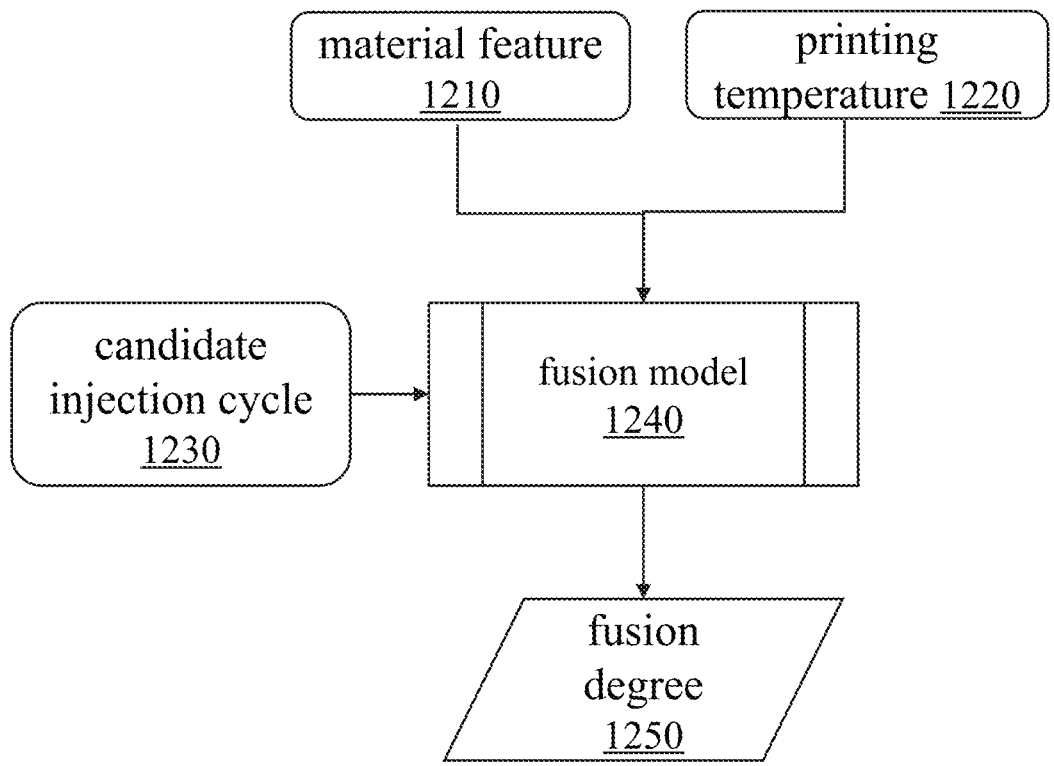
FIG. 12 is a schematic diagram illustrating a structure of a fusion model shown according to some embodiments of the present disclosure.

FIG. 12 is a schematic diagram illustrating a structure of a fusion model according to some embodiments of the present disclosure.

In some embodiments, a fusion model 1240 within the processor determines, based on a plurality of candidate injection cycles, a material feature 1210, and a printing temperature 1220, a fusion degree 1250 for each of the plurality of candidate injection cycles. The processor updates an injection cycle in a print program segment for droplet ejection based on the fusion degree. More descriptions of the material feature, the printing temperature, and the injection cycle may be found in FIG. 11 and related descriptions.

The fusion model is a model for determining the fusion degree of the candidate injection cycles, and in some embodiments, the fusion model may be a machine learning model. For example, the fusion model includes any one or combination of Convolutional Neural Networks (CNN) models, Neural Networks (NN) models, or other customized model structures, or the like.

In some embodiments, inputs to the fusion model include the candidate injection cycle, the material feature, and the printing temperature, and outputs include a fusion degree of the candidate injection cycle.

The fusion degree is configured to characterize a smoothness degree of a junction region between the droplet ejection region and the extrusion molding region. In some embodiments, the fusion degree be expressed, for example, by a numerical value, where the larger the value, the higher the fusion degree.

The candidate injection cycle 1230 is an injection cycle to be determined. In some embodiments, the processor randomly generates a plurality of candidate injection cycles based on a predetermined timeframe range, wherein the predetermined timeframe range refers to a range comprising an upper limit and a lower limit of the duration of the candidate injection cycle. The predetermined time frame may be pre-set based on historical experience.

In some embodiments, the processor trains the fusion model based on a large number of training samples with training labels via a gradient descent process. The training samples include sample candidate injection cycles, sample material features, and sample printing temperatures, and the training labels of the training samples is actual fusion degrees corresponding to the training samples. In some embodiments, the training samples may be obtained based on historical data.

In some embodiments, the processor uses an actual fusion degree of the junction region of the extrusion molding region and the droplet ejection region during the printing process corresponding to the training samples in the historical data as a training label for the training samples. The actual fusion degree is obtained by laser sensor detection. The laser sensor may be deployed at any feasible location on the print head or handheld by a technician for detection.

In some embodiments, the fusion model may be trained by inputting a plurality of training samples with training labels into an initial fusion model, constructing a loss function from the training labels and the prediction results of the initial fusion model, iteratively updating the initial fusion model based on the loss function, and when the loss function of the initial fusion model meets a predetermined condition the fusion model training is completed. The preset conditions may be that the loss function converges, the number of iterations reaches a set value, or the like.

In some embodiments, the printing platform updates, via the processor, the injection cycles in the print program segments for the droplet ejection based on the fusion degree. For example, the processor identifies a candidate injection cycle with a highest fusion degree as a new injection cycle in the print program segment for droplet ejection.

In some embodiments, by utilizing the self-learning capability of the machine learning model, the correspondence between the candidate injection cycle, the material features, the printing temperature, and the fusion degree may be obtained to determine a more accurate fusion degree, and based on the fusion degree, more appropriate injection cycle may be determined, which is conducive to reducing the time error of the periodic droplet ejection.

The embodiments provide a multi-mode 3D print head comprising a head body 1, the print head body 1 is provided with a vertical extrusion hole 11, and the extrusion hole 11 is provided with a feeding mechanism 7 above the extrusion hole 11, and a heating mechanism below the extrusion hole 11.

In some embodiments, the print head body 1 is arranged with a plurality of droplet ejection holes 13 circumferentially along a center axis of the extrusion hole (11).

In some embodiments, the lower end of each of the droplet ejection holes 13 is provided inclined toward one end of the extrusion hole 11, and the lower end of each of the plurality of droplet ejection holes 13 is flush with a lower end of the extrusion hole 11. The droplet ejection holes 13 are symmetrically arranged in pairs around the extrusion hole 11. Straight lines of central axes of the plurality of droplet ejection holes 13 intersect at an intersection point, and the intersection point is located directly below the extrusion hole 11.

In some embodiments, the print head body 1 is further provided with a plurality of droplet addition holes 12 and auxiliary side holes 14 connected to the plurality of droplet ejection holes 13. An inner diameter of the plurality of droplet addition holes 12 is greater than an inner diameter of the plurality of droplet ejection holes 13, and a droplet addition tube 6 connected to an end away from the plurality of droplet ejection holes 13. The auxiliary side holes 14 are provided perpendicular to the droplet addition holes 12 and are detachably connected with an injection auxiliary component 2.

In some embodiments, the injection auxiliary component 2 comprises a sleeve 21 secured to the auxiliary side hole 14, the sleeve 21 is provided with a moving block 23, the outer surface of the moving block 23 is circumferentially abutted against the inner wall of the sleeve 21 and the end near the auxiliary side hole 14 truncating the droplet addition hole 12. The moving block 23 is further provided with an auxiliary ejection hole 24, two openings of the auxiliary ejection hole 24 are provided towards the droplet spray hole 13 and behind the auxiliary side hole 14. The sleeve 21 is connected to an air pipe 4 at an end away from the auxiliary side hole 14 and is provided with an induction coil 22.

The auxiliary ejection hole 24 is capable of being connected to the droplet ejection hole 13 when the moving block 23 truncates the droplet addition hole 12.

In some embodiments, an inner diameter of the auxiliary ejection hole 24 is larger than the droplet ejection hole and the opening proximate to the droplet ejection hole 13 is a flare 25.

In some embodiments, a segment connecting the droplet addition hole 12 to the droplet ejection hole 13 is a conical segment. The diameter of the droplet addition hole 12 is larger than the diameter of the droplet ejection hole 13, and the inclination angle of the conical segment is 0°-45°.

The induction coil 22 is capable of adsorbing the moving block 23 after being energized, and the adsorbed moving block 23 is capable of moving away from the droplet addition hole 12.

In some embodiments, the print head body 1 is provided with an annular groove 15 on a side of the print head body 1 away from the feeding mechanism 7, the annular groove 15 is located between the extrusion hole 11 and the droplet ejection holes 13, and a heating mechanism is provided.

In some embodiments, the feeding mechanism 7 comprises a connecting frame 71 detachably connected to the print head body 1, the connecting frame 71 is provided with a driving wheel 72 and a follower wheel 73 for the transportation of the vertical profile 8 opposite each other above the extrusion hole 11, and the spacing of the follower wheel 73 with respect to the driving wheel 72 is adjustable.

The embodiments of the present disclosure provide a collaborative printing method with a multi-mode 3D print head, and include the operations of:

In S1, a software virtual printing platform obtain a three-dimensional model to be printed and profile material; (the software virtual printing platform may also be called a printing platform).

In S2, the software performs three-dimensional model slicing to obtain a to-be-printed slice of the model; (the software may also be referred to as a processor).

In S3, the software performs overall planning by printing an amount of the profile material and a dimension of the three-dimensional model, obtains a print program segment for droplet ejection and a print program segment for extrusion molding, and conveys the print program segment for droplet ejection and the print program segment for extrusion molding to a controller;

In S4, the controller runs the print program segment for the droplet ejection and the print program segment for the extrusion molding in sequence, and a compensation program is set between the print program segment for the droplet ejection and the print program segment for the extrusion molding;

In S5, a printing job is finished.

In some embodiments, the compensation program comprises a height adjustment program, and an adjustment height dimension of the height adjustment program is the same as the spacing between the lower end of the extrusion hole 11 and the intersection of the plurality of droplet ejection holes 13.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

In some embodiments, numbers describing the number of ingredients and attributes are used. It should be understood that such numbers used for the description of the embodiments use the modifier "about," "approximately," or "substantially" in some examples. Unless otherwise stated, "about," "approximately," or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A multi-mode 3D print head, comprising: a print head body, wherein the print head body is provided with an extrusion hole arranged vertically, a feeding mechanism is provided above the extrusion hole, and a heating mechanism is provided below the extrusion hole;

the print head body is arranged with a plurality of droplet ejection holes circumferentially along a center axis of the extrusion hole;

a lower end of each of the plurality of droplet ejection holes is provided inclined toward one end of the extrusion hole, and the lower end of each of the plurality of droplet ejection holes is flush with a lower end of the extrusion hole;

the plurality of droplet ejection holes are set to an even number and symmetrically arranged in pairs around the extrusion hole;

straight lines of central axes of the plurality of droplet ejection holes intersect at an intersection point, and the intersection point is located directly below the extrusion hole;

the print head body is further provided with a plurality of droplet addition holes and auxiliary side holes connected to the plurality of droplet ejection holes;

an inner diameter of the plurality of droplet addition holes is greater than an inner diameter of the plurality of droplet ejection holes, and a droplet addition tube connected to an end away from the plurality of droplet ejection holes;

the auxiliary side holes are provided perpendicular to the droplet addition holes and are detachably connected with an injection auxiliary component;

the injection auxiliary component includes a sleeve secured to the auxiliary side hole, the sleeve is provided with a moving block, the outer surface of the moving block is circumferentially abutted against the inner wall of the sleeve and the end near the auxiliary side hole truncating the droplet addition hole;

the moving block is further provided with an auxiliary ejection hole, the auxiliary ejection hole is connected to the droplet ejection hole when the moving block truncates the droplet addition hole, two openings of the auxiliary ejection hole are disposed toward the plurality of droplet ejection holes and behind the auxiliary side hole, respectively; and the sleeve is connected to an air pipe at an end away from the auxiliary side hole and is provided with an induction coil.

2. The multi-mode 3D print head of claim 1, wherein an inner diameter of the auxiliary ejection hole is larger than an inner diameter of the droplet ejection hole, and the opening close to the droplet ejection hole is a flared mouth.

3. The multi-mode 3D print head of claim 2, wherein the connecting segment between the droplet addition hole and the droplet ejection hole is a conical segment.

4. The multi-mode 3D print head of claim 3, wherein the diameter of the droplet addition hole is larger than the diameter of the droplet ejection hole, and the inclination angle of the conical segment is 0°-45°.

5. The multi-mode 3D print head of claim 1, wherein the induction coil is configured to adsorb the moving block upon energization and the adsorbed moving block is moved away from the droplet addition hole.

6. The multi-mode 3D print head of claim 1, wherein an annular groove is provided on the side of the print head body away from the feeding mechanism, the annular groove is disposed between the extrusion hole and the droplet ejection hole, and provided with the heating mechanism.

7. The multi-mode 3D print head of claim 1, wherein the feeding mechanism comprises a connecting frame detachably connected to the print head body, the connecting frame is provided opposite to each other above the extrusion hole with a driving wheel and a follower wheel for transporting a profile, and spacing of the follower wheel relative to the driving wheel is adjusted based on a diameter of the profile.

* * * * *